Patented Feb. 13, 1934

1,947,169

UNITED STATES PATENT OFFICE 1,947,169

INSECTICIDE

William Kelley Price, Selah, Wash.

No Drawing. Application March 14, 1930
Serial No. 435,955

2 Claims. (Cl. 167—32)

My invention relates to insecticides, and more particularly to a mixture and a method for repelling codling moths and the like.

Difficulty is experienced in the protecting of apples, pears, quinces, and perhaps other fruits, from codling moths which lay eggs on fruit, such eggs hatching into worms which eat into the fruit and spoil it.

The method most commonly employed in combating the codling moth involves the spraying of the trees with an arsenic-containing mixture prior to the hatching of the moth eggs so that upon hatching the worms will eat the arsenic and die. However, this method results in only partial control of the pest, and pure-food laws in some localities require the removal of the arsenic from the fruit before it may be offered for sale. The removal of the arsenic is not only expensive, but adversely affects the "keeping" quality of the fruit.

I have found that naphthalene and other materials, such as benzine hydrocarbons, will, when sprayed upon the trees, serve to repel the codling moths so that they will not lay their eggs upon the trees so sprayed.

However, the naphthalene when sprayed in an emulsified or diluted condition, vaporizes too rapidly to have sufficient permanence for the purpose of repelling the moths. To overcome this difficulty, I provide a carrier such as emulsified oil, liquid soap, casein, etc., which carrier, when mixed with naphthhalene, in proper proportions, will prevent too rapid vaporization or evaporation of the naphthalene, but will, at the same time, permit it to evaporate at such rate as to repel the moths, over a sufficient period of time during the egg-laying season.

One manner of practising my invention involves the mixing of emulsified naphthalene, oil, and water in substantially the following proportions, it being understood that other material of the naphthalene group and a carrier other than oil, as above-stated, may be employed instead of the substances specifically named:

Emulsified naphthalene _____ 1 lb.
Emulsified oil_ 3 gallons (approximately 20 lbs.)
Water _____ 300 gallons.

This mixture is applied to the trees in the form of a mist, by forcing it through a spray nozzle at a pressure of about 250 lbs. or more, per square inch. The application of the mixture in an atomized condition at a pressure of 250 lbs. or more per square inch results in the forming of a film on the fruit.

While the proportions may be varied somewhat, it is of course important that the naphthalene should not be of too small a quantity and that sufficient oil be employed to prevent the naphthalene from evaporating too rapidly. Furthermore, if sufficient oil is employed, it will serve to smother and control aphids and scale. A spraying pressure of less than 250 lbs. per square inch is not likely to sufficiently cover the trees with the spray.

The emulsified naphthalene and emulsified oil mixes readily with water at normal temperatures. The emulsification of the naphthalene and the oil may be effected by various methods frequently employed by chemists working with these substances, as by mixing sodium silicate or sulphuric acid with oil and a small quantity of water; and by finely dividing the naphthalene and mixing it with a small quantity of water and a soap solution to maintain it in suspension.

The oil may be suitably refined petroleum oil. If a greater proportion of naphthalene is employed than as above specified, it will do no harm to the foliage of the trees, because it is a neutral substance that is neither acid nor alkaline.

I have found, also, that the naphthalene is poisonous to the worms which hatch from the eggs deposited on the fruit by the codling moths and that after the worms are hatched they are poisoned by the naphthalene and die. Thus the fruit is protected, even though some of the moths will lay eggs therein nothwithstanding the presence of the naphthalene. This discovery is of great importance by reason of the fact that the naphthalene, while poisonous to the worms, is of course non-poisonous to human beings, as is arsenic.

I claim as my invention:—

1. The method of repelling codling moths, which comprises spraying fruit trees and the like with a mixture containing naphthalene and a carrier therefor that is less readily vaporizable than the naphthalene, but which will permit vaporization of the naphthalene, the mixture being applied in an atomized condition and at such pressure that a film thereof is formed on the fruit.

2. The method of repelling codling moths, which comprises spraying fruit trees and the like with a mixture containing naphthalene and emulsified oil, the mixture being applied in an atomized condition and at a pressure of not materially less than 250 lbs. per square inch.

WILLIAM KELLEY PRICE.